United States Patent
Hodoya et al.

(10) Patent No.: US 7,427,090 B2
(45) Date of Patent: Sep. 23, 2008

(54) BUMPER REINFORCEMENT FOR VEHICLE

(75) Inventors: Kohei Hodoya, Anjo (JP); Jun Shobo, Himi (JP); Kiyoichi Kita, Takaoka (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 30 days.

(21) Appl. No.: 11/498,066

(22) Filed: Aug. 3, 2006

(65) Prior Publication Data

US 2007/0029824 A1 Feb. 8, 2007

(30) Foreign Application Priority Data

Aug. 5, 2005 (JP) ............................. 2005-228411

(51) Int. Cl.
*B60R 19/02* (2006.01)
(52) U.S. Cl. .................................... 293/102
(58) Field of Classification Search ................ 293/102, 293/120, 121, 132, 149, 154, 155
See application file for complete search history.

(56) References Cited

U.S. PATENT DOCUMENTS

| 4,749,613 | A | * | 6/1988 | Yamada et al. .............. 442/366 |
| 4,762,352 | A | * | 8/1988 | Enomoto ..................... 293/120 |
| 4,961,603 | A | * | 10/1990 | Carpenter .................... 293/102 |
| 5,584,518 | A | * | 12/1996 | Frank et al. ................. 293/155 |
| 5,803,517 | A | * | 9/1998 | Shibuya ...................... 293/120 |
| 6,672,635 | B2 | * | 1/2004 | Weissenborn et al. ....... 293/120 |
| 6,695,368 | B1 | * | 2/2004 | Weykamp et al. ........... 293/154 |
| 6,886,873 | B2 | * | 5/2005 | Weykamp et al. ........... 293/133 |
| 7,080,862 | B2 | * | 7/2006 | Suzuki et al. ................ 293/154 |
| 7,210,719 | B2 | * | 5/2007 | Honda et al. ................ 293/155 |
| 2002/0033610 | A1 | * | 3/2002 | Mori et al. ................... 293/102 |
| 2006/0186680 | A1 | * | 8/2006 | Honda et al. ................ 293/155 |

FOREIGN PATENT DOCUMENTS

| JP | 7-215146 | 8/1995 |
| JP | 2003-312399 | 11/2003 |

* cited by examiner

*Primary Examiner*—H Gutman
(74) *Attorney, Agent, or Firm*—Finnegan, Henderson, Farabow, Garrett & Dunner, LLP

(57) ABSTRACT

A bumper reinforcement for a vehicle includes a main body formed from a steel plate and including a front surface of which each end has an inclined surface inclined rearward and outwardly in a side direction and a cover welded to the main body at the both ends of the main body for covering the inclined surface and having a flange welded to a base plate for closing an opening provided in the main body.

7 Claims, 5 Drawing Sheets

BUMPER REINFORCEMENT FOR VEHICLE

CROSS REFERENCE TO RELATED APPLICATIONS

This application is based on and claims priority under 35 U.S.C. § 119 to Japanese Patent Application 2005-228411, filed on Aug. 5, 2005, the entire content of which is incorporated herein by reference.

FIELD OF THE INVENTION

This invention generally relates to a bumper reinforcement for a vehicle. More specifically, this invention pertains to a bumper reinforcement utilized for a bumper apparatus for a vehicle.

BACKGROUND

A bumper apparatus including a bumper reinforcement is attached to a front and rear of a vehicle for minimizing shock impact to an occupant and to a vehicle body by absorbing and reducing collision energy transmitted to the vehicle body as much as possible at the time of a front or rear collision of a vehicle. The bumper reinforcement extends in a vehicle width direction. The bumper apparatus for the vehicle includes an energy absorber made of elastic material such as urethane foam, of which its main object is to protect pedestrians, a bumper reinforcement for holding the energy absorber and for absorbing large collision energy by self-deformation, and a bumper stay for fixing the bumper reinforcement to a vehicle body (for example, to a side member).

The bumper reinforcement, which extends in the vehicle width direction, plays an important role in absorption of large collision energy at the time of the front or rear collision of the vehicle. A bumper reinforcement made of extruded shape of aluminum alloy, instead of steel, is suggested in JP2003-312399A and JPH7 (1995)-215146A in order to improve fuel efficiency by weight reduction of the vehicle. However, costs of such an extruded shape tends to be higher than steel.

The bumper reinforcement needs to efficiently absorb the collision energy at the time of an oblique collision (with a barrier having an angle of 30 degrees) and a frontal collision including a collision with a pole. In other words, it is generally preferable for a stroke-load diagram to have a shape similar to a rectangular wave. However, in a load diagram of conventional one, a value of a load against increase of a stroke decreases as the stroke increases. Accordingly, it is difficult to say that the conventional one is highly efficient. In particular, the conventional one has a disadvantage in absorption of the collision energy at the time of oblique collision.

A need thus exists for a bumper reinforcement made of a steel plate, which has improved efficiency in absorption of collision energy in particular at the time of oblique collision. The present invention has been made in view of the above circumstances and provides such a bumper reinforcement.

SUMMARY OF THE INVENTION

According to an aspect of the present invention, a bumper reinforcement for a vehicle includes a main body formed from a steel plate and including a front surface of which each end has an inclined surface inclined rearward and outwardly in a side direction and a cover welded to the main body at the both ends of the main body for covering the inclined surface and having a flange welded to a base plate for closing an opening provided in the main body.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
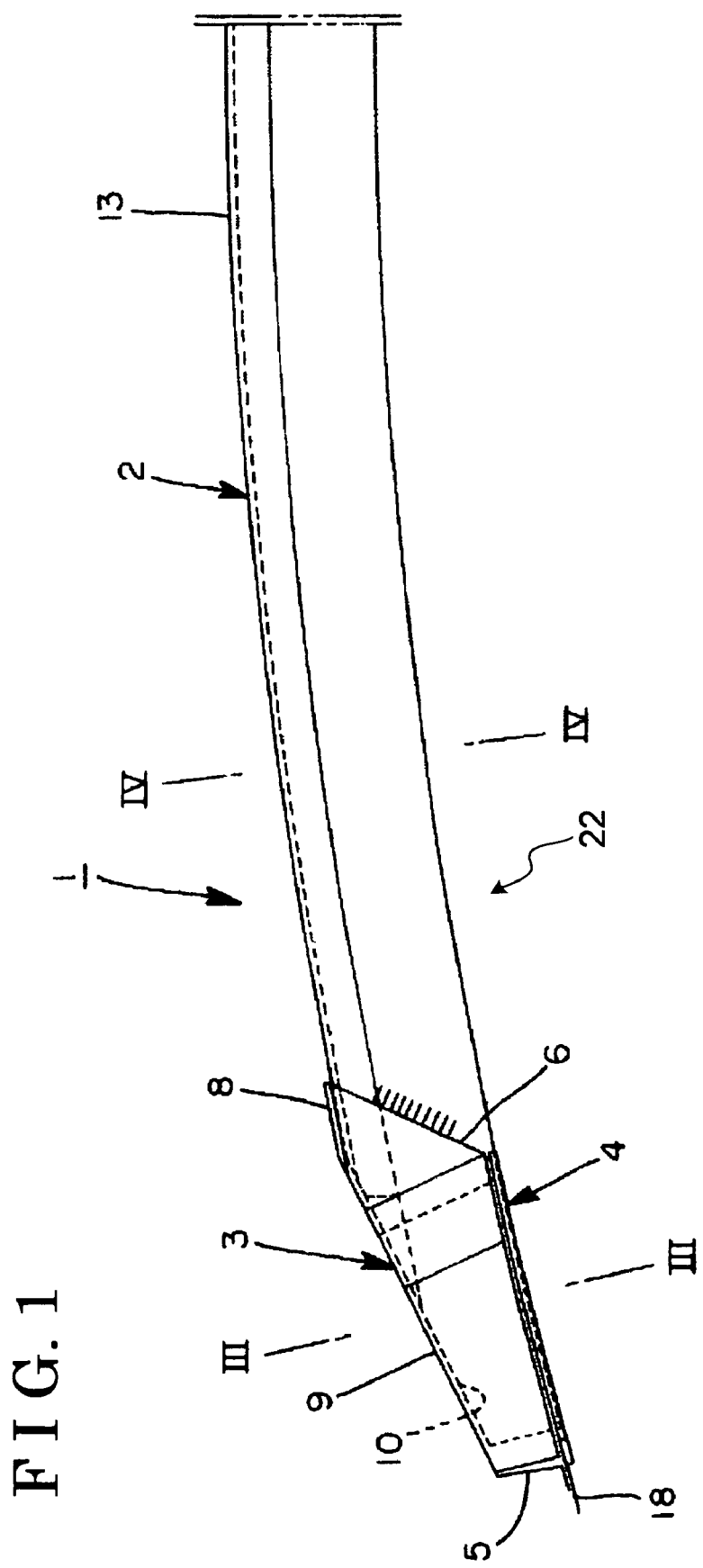
FIG. 1 represents a front view illustrating a left half of a bumper reinforcement according to an embodiment of the present invention.

An embodiment of the present invention will be explained with reference to drawing figures. At first, explanation will be made with reference to FIGS. 1 to 6. A bumper reinforcement 1 for a vehicle 22 according to the embodiment of the present invention includes a main body 2 obtained by roll forming of a steel plate, a cover 3, and a base plate 4. The cover 3 is welded so as to cover at least a front surface of each end portion (only left side is illustrated in FIG. 1) of the main body 2.

Figure 2:
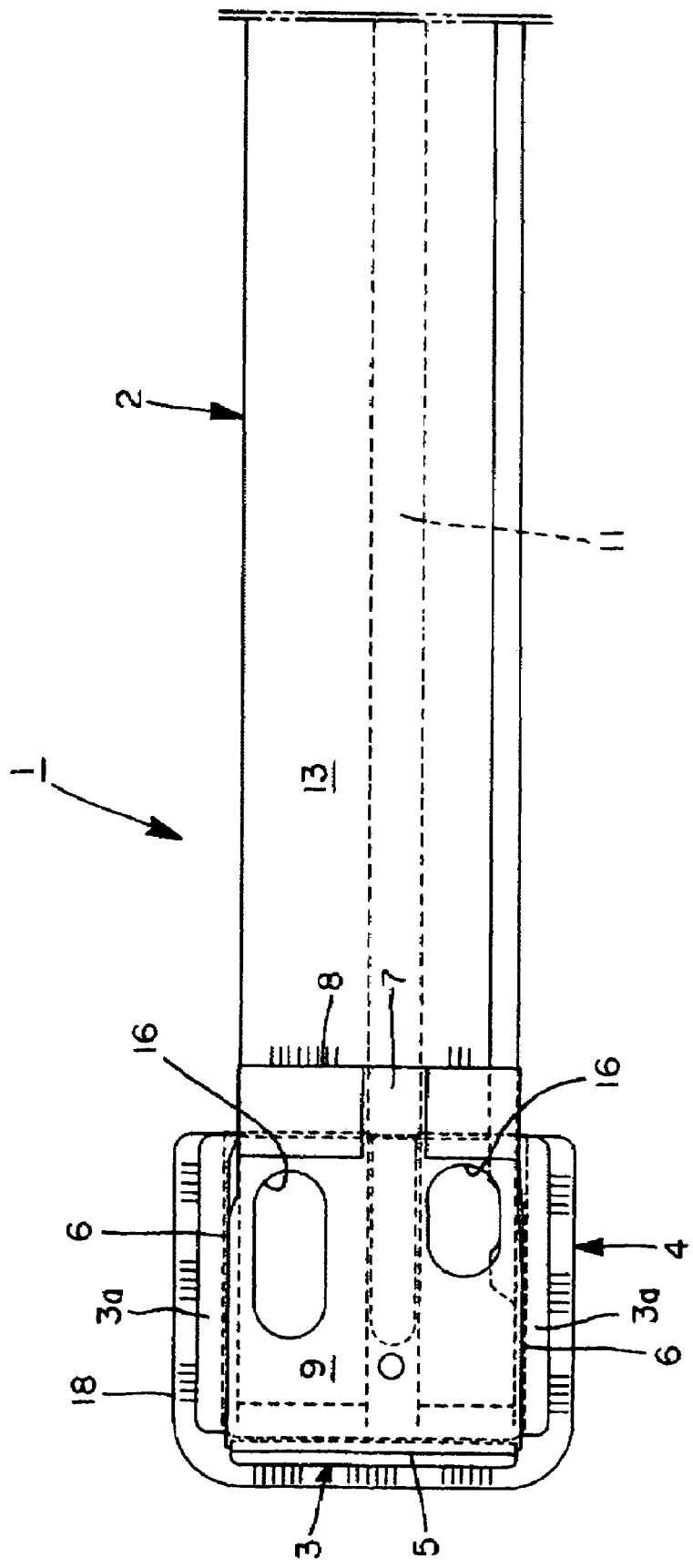
FIG. 2 represents a plane view illustrating the embodiment illustrated in FIG. 1.
Figure 3:
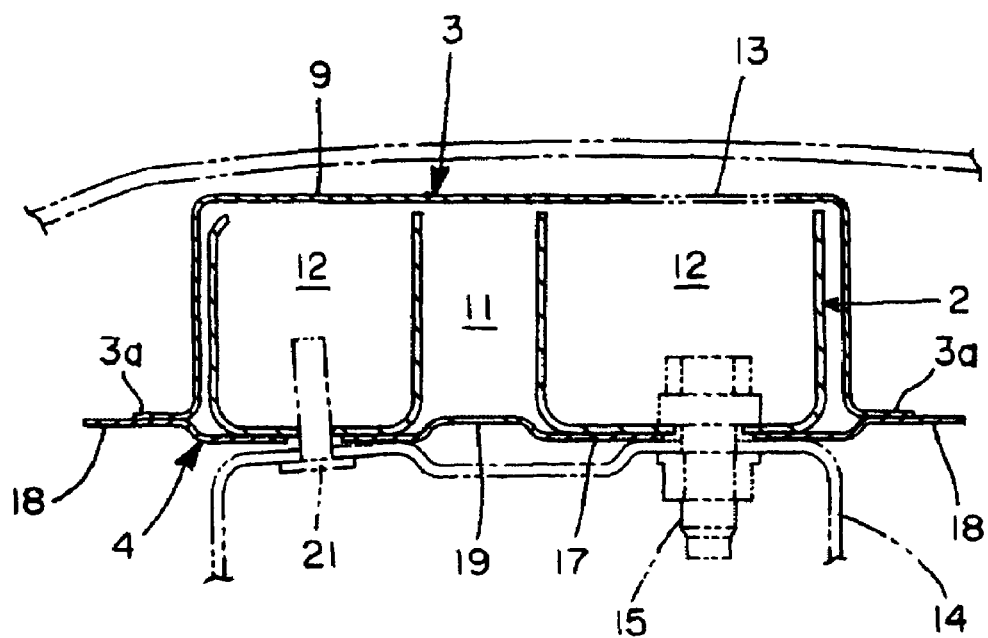
FIG. 3 represents a cross-sectional view seen from an arrow III-III of FIG. 1.
Figure 4:
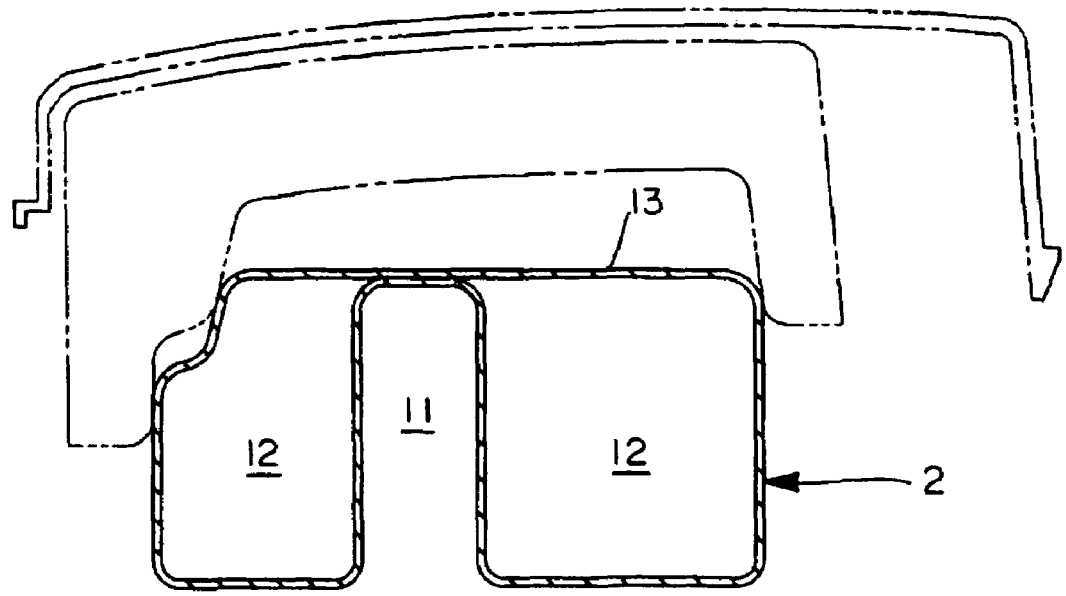
FIG. 4 represents a cross-sectional view seen from an arrow IV-IV of FIG. 1.
Figure 5:
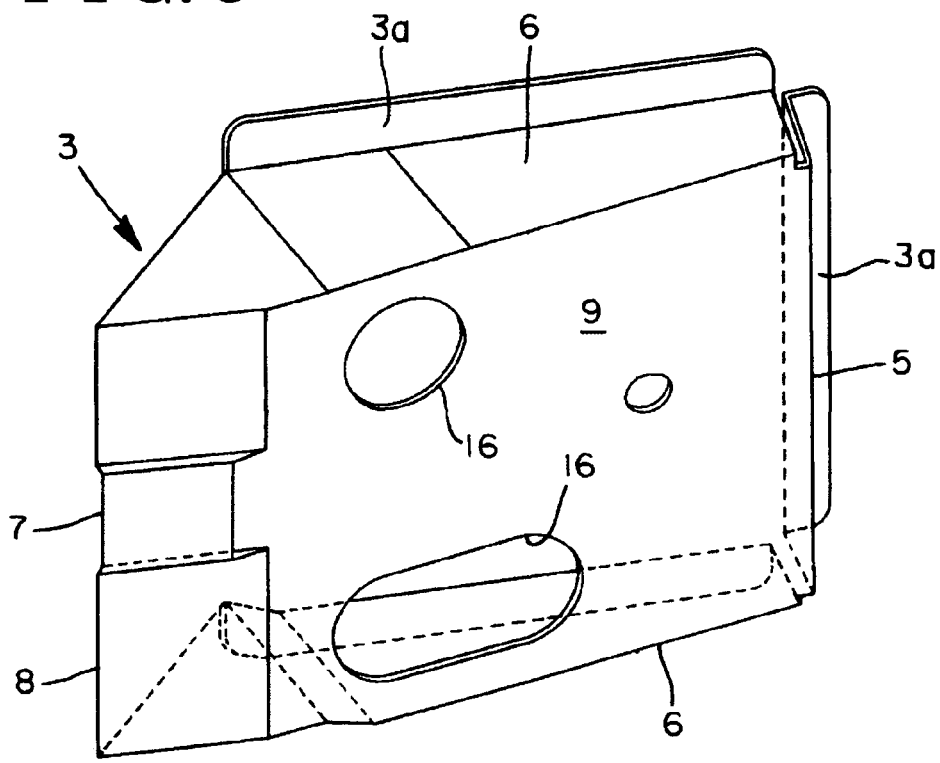
FIG. 5 represents a perspective view illustrating a cover.

As illustrated in FIGS. 2 and 5, the cover 3 is approximately shaped as a box. The cover 3 includes an end wall portion 5, both side wall portions 6, a front wall portion 8 including a recessed portion (in other words, a stepped portion 7) provided along the front surface of the main body 2, and a main wall portion 9 provided along an inclined surface 10 (refer to FIG. 1) of the main body 2. Front portions of the both end portions of the main body 2 are cut by a cutting angle of 25 to 45 degrees, preferably by a cutting angle of 30 degrees, so as to make cut and inclined surfaces 10 which is inclined outwardly in a side direction. As illustrated in FIG. 4, the main body 2 is formed from a steel plate by roll forming. The main body 2 includes closed hollow portions 12, 12 provided at the both sides and an end-opened hollow portion 11 (opening of the main body 2) provided therebetween. As illustrated in FIG. 3, a front wall portion 13, which defines the hollow portions 12, 12, and 11, is cut at both end portions of the main body 2 so as to make cut and inclined surfaces 10.

The cover 3 is welded to each end portion of the main body 2 so that the main wall portion 9 of the cover 3 covers the cut and inclined surface. Positions of welding are not particularly determined to positions of welding marks illustrated in the figure. The main wall portion 9 of the cover 3 includes a working hole 16. As illustrated in FIG. 3, the working hole 16 contributes to simplify fastening work of a bolt 15 for fixing the bumper reinforcement 1 to a side member 14 of the vehicle body side. The stepped portion 7 of the cover 3, which extends to the hollow portion 11 of the main body 2, contributes to simplify determination of a relative position of the cover 3 to the main body 2.

Figure 6:
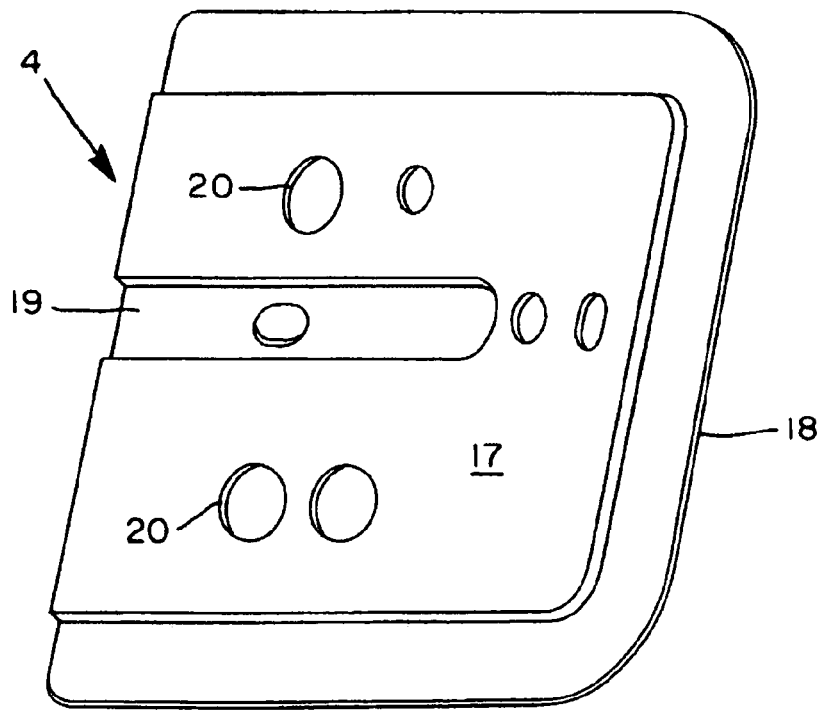
FIG. 6 represents a perspective view illustrating a base plate.

As illustrated in FIGS. 2, 3, and 6, the base plate 4 is positioned at a lower side of the both end portions of the main body 2. The base plate 4 includes a main flat portion 17, which is in contact with a lower surface of the main body 2, and a flange 18, which extends from three side edges of the flat portion 17 upwardly in a side direction with a step. The flange 18 is in contact with a bottom wall portion (flange) 3a of the cover 3, and the flange 18 is welded to the bottom wall portion (flange of the cover) 3a. The flat portion 17 includes a recessed portion 19, which is recessed toward a direction of the hollow portion 11 of the main body 2 at the center. The flat portion 17 contributes to enhance rigidity of the base plate 4. Further, the flat portion 17 contributes to simplify determination of a position thereof relative to the cover 3. The flat portion 17 includes a bolt-insertion hole 20. In the meantime, in the left side of FIG. 3, a pin 21 for fitting holes together at the time of fastening a bolt of the right side is illustrated.

Next, assembling work of the bumper reinforcement 1 will be explained. The main body 2, which has a cross-sectional shape illustrated in FIG. 4, is formed by the roll forming of the steel plate. The front wall portion 13 is cut at the both end portions of the main body 2 by a 30 degrees angle to make the low inclined surface 10, which is inclined outwardly in a side direction. The cover 3 is placed to the inclined surface 10 to close upper portions of the hollow portions 11 and 12. Then, the cover 3 is welded to the main body 2. Further, the base plate 4 is placed at the both end portions of the main body 2, and the flange 18 of the base plate 4 is welded to the cover 3. Thus, the bumper reinforcement 1 is comprised of the main body 2, the cover 3, and the base plate 4. In FIG. 3, though the bumper reinforcement 1 is fixed to the side member 14 through the working hole 16 by using the bolt 15, other common fixing means can be utilized.

Figure 7:
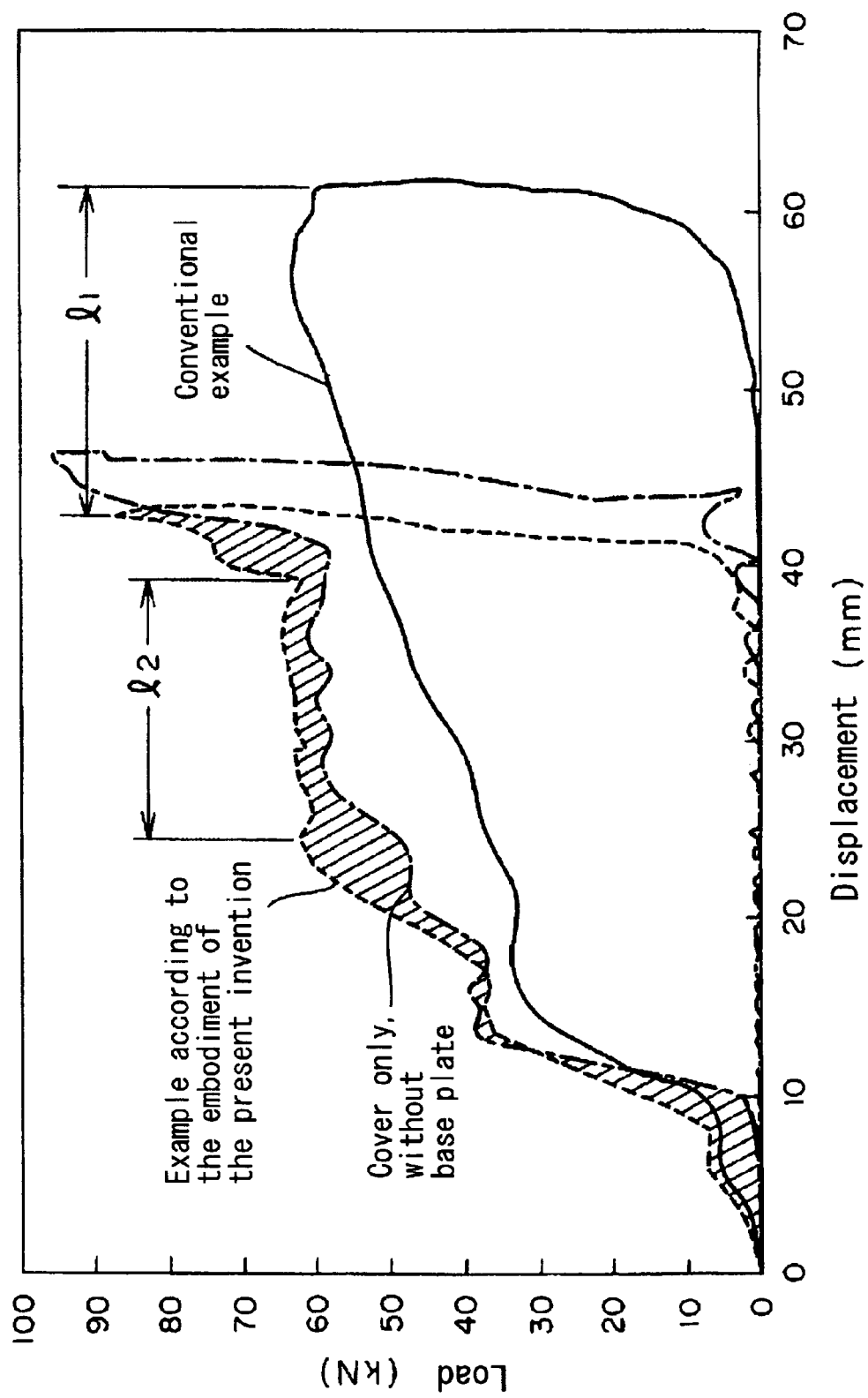
FIG. 7 represents a stroke-load diagram.

With reference to FIG. 7, performance of collision energy absorption at the time of an oblique collision will be explained. A dotted line in FIG. 7 represents the embodiment (embodiment illustrated in FIG. 1) of the present invention. A dashed line represents an example in which the base plate 4 is removed from the embodiment illustrated in FIG. 1. A solid line represents an example in which a bumper reinforcement, in which the cut surface is not provided at the main body in the cross-section illustrated in FIG. 4, and in which the main body extends as a shape of a bar, is utilized. Materials, dimensions, testing conditions are identical in the embodiment and the two examples. In the embodiment of the present invention (dotted line), deformation stroke of the bumper reinforcement at the time of an oblique collision is shorter than that of the conventional example (solid line) by $l_1$. Further, a peak value of energy absorption can be retained to be higher than the conventional example in a width of $l_2$. Thus, performance of energy absorption is preferable. By comparison of the embodiment of the present invention with the example without the base plate (indicated by the dashed line), it can be clarified that the embodiment of the present invention can have higher performance than the example in an area illustrated by hatching. Accordingly, it can be found that a combination of the cover and the base plate effectively contributes to absorption of collision energy at the time of an oblique collision.

According to a first aspect of the present invention, basically, a front surface of each end of a bumper reinforcement is an inclined surface inclined outwardly in a side direction. According to the aspect of the present invention, in a situation where an oblique collision is a collision with a barrier, contact surfaces between the oblique collision barrier and the bumper reinforcement can be wide, terminal pinpoint bucking can be prevented, and load at an initial stage of the oblique collision can rise at once. Accordingly, a stroke-load diagram can be approximately rectangular wave. Therefore, a level of effect of absorption of collision energy can be enhanced.

According to a second aspect of the present invention, the bumper reinforcement for the vehicle, in which the bumper reinforcement is formed from a steel plate, and in which the front surface of each end of the main body of the bumper reinforcement is an inclined surface which is inclined rearward and outwardly in a side direction, and in which the cover with a flange is welded to the main body for covering the inclined surface, and in which the flange of the cover is welded to a base plate for closing an opening provided in the body, can be provided.

According to a third aspect of the present invention, the main body is made by roll forming, and the front surface of the end portion of the main body can be a cut surface. Further, the main body can include closed hollow portions at the both sides and a one-end opened hollow portion at the center.

According to a fourth aspect of the present invention, the cover includes a stepped portion for covering a front wall surface of the main body.

According to the aspects of the present invention, at the time of an oblique collision, contact surfaces between the barrier and the bumper reinforcement can be large. Accordingly, the stroke-load diagram can be approximately the rectangular wave. Therefore, absorption of collision energy can be effectively performed. Because improvement in efficiency of absorption of collision energy can decrease backward moving distance of the bumper reinforcement at the time of collision, degree of freedom in design of a bumper apparatus can be enhanced.

In addition, utilization of the cover and the base plate enhances rigidity of the end portion of the bumper reinforcement. Accordingly, pinpoint buckling (at a point) at the end portion of the bumper reinforcement can be prevented at the time of both a front collision and an oblique collision.

The principles, preferred embodiment and mode of operation of the present invention, have been described in the foregoing specification. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A bumper reinforcement for a vehicle, comprising:
   a main body formed from a steel plate and including a front surface of which each end has an inclined surface inclined rearward and outwardly in a side direction; and
   a cover welded to the main body at both said ends of the main body for covering the inclined surface and having a flange welded to a base plate for closing an opening provided in the main body.

2. The bumper reinforcement for the vehicle according to claim 1, wherein the main body is formed by roll forming and the inclined surface is a cross sectional plate formed by cutting each end of the front surface of the main body.

3. The bumper reinforcement for the vehicle according to claim 2, wherein the main body further includes a closed hollow portion at each side and an open hollow portion at a center portion between the closed hollow portions and having the opening at one end thereof.

4. The bumper reinforcement for the vehicle according to claim 3, wherein the cover includes a stepped portion for covering a front wall surface of the main body.

5. The bumper reinforcement for the vehicle according to claim 1, wherein the base plate includes a flat portion which contacts with a rear surface of the main body, a stepped flange which extends from side edges of three directions of the flat portion, and a recessed portion provided at a center of the flat portion and recessed toward the opening of the main body.

6. The bumper reinforcement for the vehicle according to claim 1, wherein the inclined surface is inclined outwardly in a side direction by 25 to 45 degrees.

7. The bumper reinforcement for the vehicle according to claim 6, wherein the inclined surface is inclined outwardly in a side direction by 30 degrees.

* * * * *